(12) United States Patent
Bayley et al.

(10) Patent No.: US 6,611,673 B1
(45) Date of Patent: Aug. 26, 2003

(54) RADIO FREQUENCY-CONTROLLED TELECOMMUNICATION DEVICE

(76) Inventors: Oliver T. Bayley, 196 Surf St., Pacifica, CA (US) 94044; Bernard J. Kerr, 16 Mariri Rd., Kelburn, Wellington 5 (NZ); Geoffrey M. Smith, 223 Hawthorne Ave., #2, Palo Alto, CA (US) 94301; James E. Dishman, 10670 NW. Annette Ct., Portland, OR (US) 97229; Mark A. McCabe, 436 N. Claremont St., San Mateo, CA (US) 94401; John M. Ananny, 522 Greenwich Ave., San Francisco, CA (US) 94133

( * ) Notice: Subject to any disclaimer, the term of this patent is extended or adjusted under 35 U.S.C. 154(b) by 0 days.

(21) Appl. No.: 09/351,995

(22) Filed: Jul. 12, 1999

(51) Int. Cl.[7] .............................. H04B 5/00; H04B 1/38; H04M 3/00; H04Q 5/22; G08B 13/14
(52) U.S. Cl. ........................ 455/41; 419/420; 419/564; 340/10.3; 340/572.1
(58) Field of Search ................................ 455/550, 564, 455/575, 73; 235/375, 378, 383, 385, 451, 472.02, 492; 379/444, 167.05, 355.01; 340/10.3, 10.41, 10.42, 7.1, 572.1, 573.4, 10.1; 705/28

(56) References Cited

U.S. PATENT DOCUMENTS

| | | | |
|---|---|---|---|
| 5,434,572 A | * 7/1995 | Smith | 342/44 |
| 5,461,385 A | 10/1995 | Armstrong | 342/42 |
| 5,550,547 A | 8/1996 | Chan et al. | 342/42 |
| 5,729,697 A | 3/1998 | Schkolnick et al. | 395/223 |
| 5,764,138 A | 6/1998 | Lowe | 340/447 |
| 5,798,693 A | * 8/1998 | Engellenner | 340/505 |
| 5,982,363 A | 11/1999 | Naiff | 345/327 |
| 6,008,727 A | 12/1999 | Want et al. | 340/572.1 |
| 6,036,086 A | * 3/2000 | Sizer, II et al. | 235/375 |

* cited by examiner

Primary Examiner—Edward F. Urban
Assistant Examiner—Meless Zewdu
(74) Attorney, Agent, or Firm—Van Pelt & Yi LLP (57) ABSTRACT

Provided are telecommunications devices and systems which incorporate and use radio frequency (RF) tag technology. Telecommunications devices in accordance with one embodiment of the present invention incorporate RF transceivers (readers) which are configured to read associated RF transponders (tags) in order to automatically dial desired telephone numbers without the need for a manual user interface. Tags in systems in accordance with this embodiment of the present invention may be attached to or incorporated with a myriad of items, including picture frames, consumer products and packaging, advertising and promotional material, electronic business cards, record-keeping systems, etc. Devices and systems in accordance with the present invention have a variety of telephony and non-telephony applications.

16 Claims, 6 Drawing Sheets

RADIO FREQUENCY-CONTROLLED TELECOMMUNICATION DEVICE

CROSS-REFERENCE TO RELATED APPLICATIONS

This application is related to co-pending application Ser. No. 09/306,688, filed May 6, 1999, entitled INTERACTIVE RADIO FREQUENCY TAGS, the disclosure of which is incorporated by reference herein for all purposes.

BACKGROUND OF THE INVENTION

The present invention relates generally to the field of radio frequency tag technology. More specifically, the present invention relates to radio frequency-controlled telecommunications devices and systems.

Radio frequency (RF) tag technology has conventionally been used for identifying objects in radio frequency identification (RF ID) systems. In an RF ID system, information is carried on a tag (transponder) which is typically attached to an object of interest. When the tag comes within a RF signal field generated by a reader (transceiver) the tag responds to the incident IRF signal. Typically, the tag reflects the incident RF carrier back to the reader in a form modulated by the tag according to the information with which the tag has been previously programmed.

RF tags may be passive or active. Active tags are powered by a battery which is incorporated into the tag. Passive tags do not have batteries. They derive their power inductively or capacitively from the RF signal transmitted by the reader to interrogate the tag.

Figure 1A:
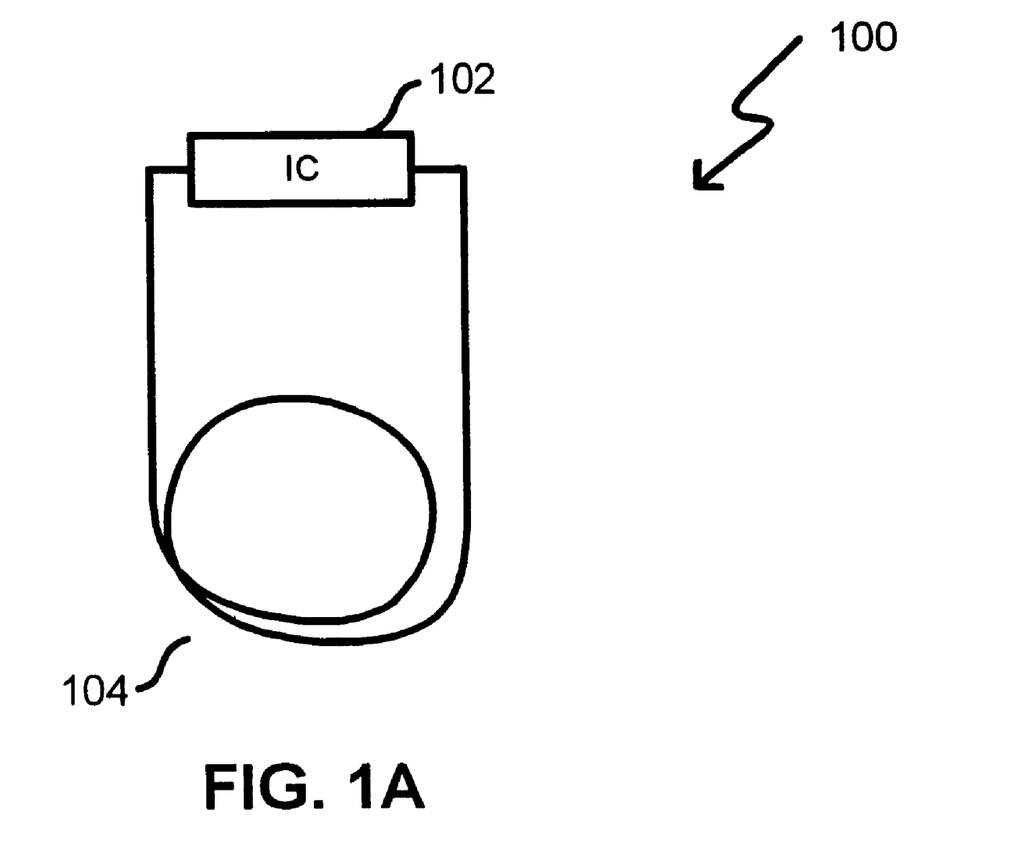
FIG. 1A depicts a block diagram illustrating a conventional passive RF tag.

FIG. 1A illustrates a conventional passive RF tag. The tag 100 has two main components: a semiconductor chip (integrated circuit (IC)) 102 having interface circuits, logic, and memory (not shown); and an antenna 104. The interface circuits of the IC 102 portion of a passive RF tag typically include an analog and a digital circuit. The analog circuit detects and decodes the RF signal and provides power to the digital circuit using the RF field strength of the reader. The digital circuit implements an information protocol which has been previously programmed into the tag. RF tags generally also include a variety of other discrete components, such as capacitors, clocks, and interconnections between components, a substrate for mounting components, and an enclosure.

Figure 1B:
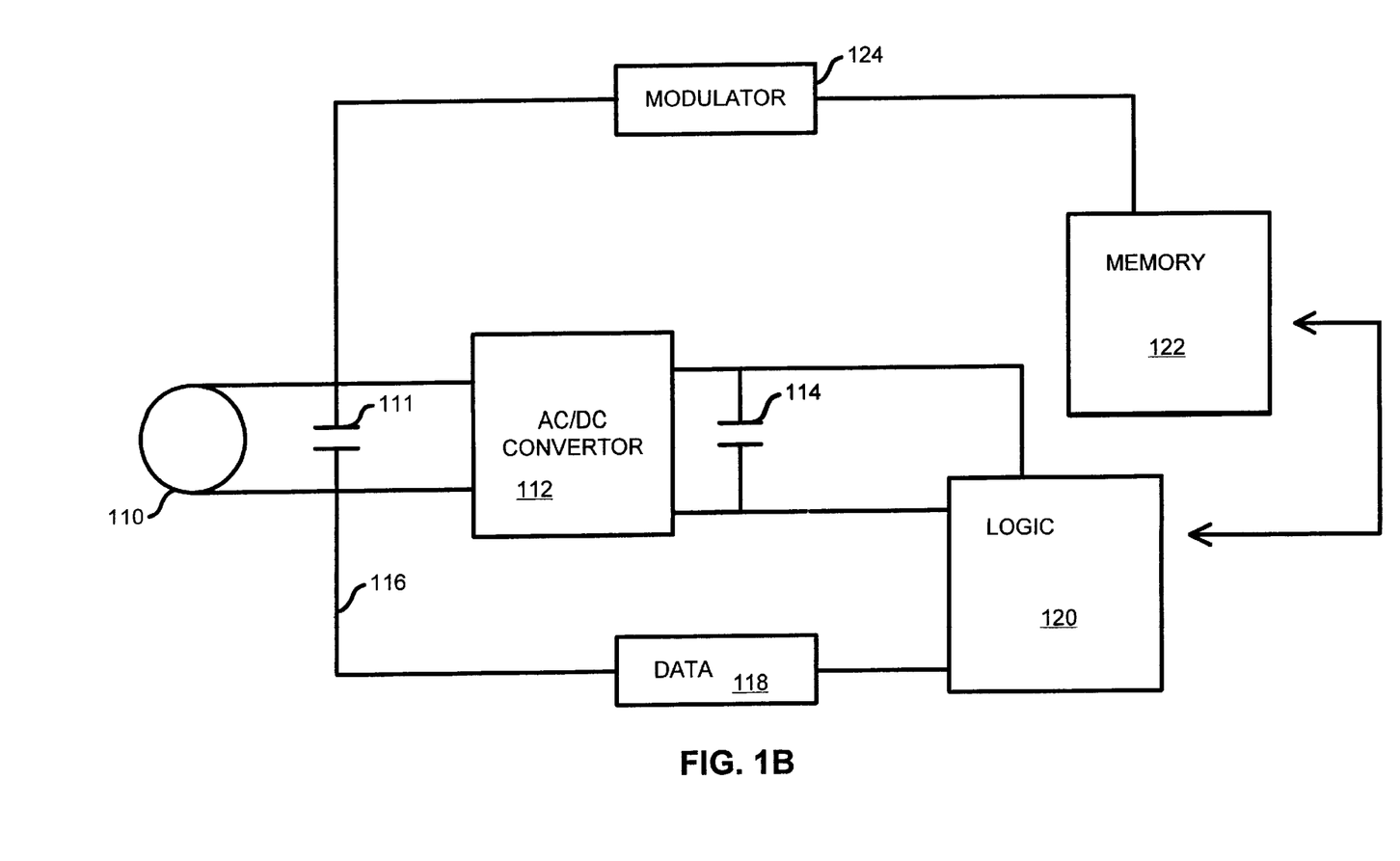
FIG. 1B depicts a block diagram illustrating additional details of a typical passive RF tag.

FIG. 1B depicts a block diagram providing additional structural information for a typical passive RF tag. The figure is not a schematic depiction of an RF tag, but is intended as an illustration of the main function elements of a typical tag and their interconnections to provide a basis for describing the actions that take place when a tag (transponder) enters the RtF field of a reader (transceiver), in order to assist in the understanding of the operation of RF tags.

An RF signal from a transceiver is received by the tag's antenna 110 when the tag enters the reader's RF field. From the antenna 110, the signal is typically split into a portion that provides the power for the tag which is smoothed by a capacitor 111, and a portion that provides the data to be read by and responded to by the tag's programmed logic. The power portion of the signal goes into a rectifier 112 (AC to DC converter) and the emerging DC signal is smoothed by a capacitor 104. The data portion of the split signal is conveyed along a conductive line 116 to a data extractor 118 which demodulates the signal and extracts the digital binary command data for the logic processor 120. The logic processor 120 receives the command and carries out the command instructions, which typically involves reading data from the tag's memory 122. The data read from the memory 122 is then output to a modulator 124 which modulates the digital data into an analog signal. The signal is then conveyed to the antenna 110 and transmitted back to the transceiver. RF tags also typically include additional elements not illustrated in FIG. 1B or discussed above, such as encoders/decoders and clock extractors.

As noted above, radio frequency (RF) tag technology, particularly passive RF tag technology, has conventionally been used for identifying objects in radio frequency identification (RF ID) systems. Thus the conventional application of RF tags has been in tracking objects of interest. When the tag comes within a RF signal field generated by a reader (transceiver) the tag responds to the transceiver's incident RF signal alerting the transceiver of its presence. A typical reader includes a computer processor which issues commands to a RF transmitter and receives commands from an RF receiver. The processor may also perform one or more functions based on the tags presence in its RF field.

For example, RF tags are used by airlines to track passenger luggage. When a passenger checks a piece of luggage it is tagged with an RF ID tag programmed with an identifier for that piece of luggage. When the luggage tag comes within the RF signal field of one of many RF ID readers located throughout the luggage system, the tag may be interrogated by the reader and the location of the luggage may be reported to a central tracking system by the reader's processor. Similarly, RF tag technology is used in "card key" systems. A card key contains a RF ID tag identifying the holder as a person authorized to pass through a door or gate. When the card comes within the RF signal field of an RF ID reader located at a door or gate, the tag may be interrogated by the reader and the authorization of the cardholder to pass may be confirmed, the door or gate my be opened, and the cardholder's passage recorded by the reader's processor.

While conventional implementations of RF tag technology have been useful in such tracking applications, RF tag technology has not so far been applied in many user interactive applications. The present inventors believe that RF tag technology offers the potential for a whole array of unexplored applications based on RFI tags and readers with increased functionality.

One area of technology where the present inventors see great potential for the use of RF tag technology is telecommunications. Conventional telephones typically have a manually operated user interface whereby a user enters a multi-digit telephone number for a person, business or other entity which he or she desires to call via a number dial or pad. The convenience of this manual interface may be improved in conventional devices by the use of such features as "speed-dial" which allows a user to program frequently called numbers into a memory in the telephone and then dial one of those multi-digit numbers by pressing a single button. Presently, automatic telephone dialing interfaces, that is dialing interfaces which do not require user contact to enter a telephone number to be dialed, are not available other than perhaps in preprogrammed or random number dialing systems. Convenient systems for home or work use that allow a user to automatically dial a particular number of the users choice are unknown.

In addition, the present inventors contemplate that RF controlled telecommunications devices could have a variety of applications beyond conventional telephony. Such applications would require telecommunications devices and systems which incorporate and use RF tag technology in novel ways.

Accordingly, the development and application of RF telecommunications devices and systems which incorporate and use RF tag technology in novel ways is desirable.

SUMMARY OF THE INVENTION

The present invention meets this need by providing telecommunications devices and systems which incorporate and use RF tag technology. Telecommunications devices in accordance with one embodiment of the present invention incorporate RF transceivers (readers) which are configured to read associated RF transponders (tags) in order to automatically dial desired telephone numbers without the need for a manual user interface. Tags in systems in accordance with this embodiment of the present invention may be attached to or incorporated with a myriad of items, including picture frames, consumer products and packaging, advertising and promotional material, electronic business cards, record-keeping systems, etc., as further described below. Devices and systems in accordance with the present invention have a variety of telephony and non-telephony applications.

Systems in accordance with the present invention may have associated computer software including databases of numbers available for dialing selected by a tag/reader interaction controlled by the user. In such systems, an individual or entity's phone number may be represented by a code stored in the RF tag memory which references a telephone number in the database. This embodiment is particularly useful in a number of situations, such as where the numbers of interest are known ahead of time so that codes rather than the entire numbers are all that is needed to be stored in the tag's relatively limited memory. If an individual or entity's number changes, the new number may be stored in the database in the location accessed by the code stored in the tag memory so that reprogramming of the individual tags is not necessary. The tag memory could also contain additional numbers that would allow for automatic navigation of phone mail systems where the sequence to access the desired location is known and programmed into the tag in advance.

In another embodiment, RF controlled telecommunications devices in accordance with the present invention may be configured for phone number gathering, for instance from the memory of a RF tag business card. For example, a portable telephone may be touched to an electronic business card or directory containing an RF tag to store phone numbers in the phone's memory.

In still another embodiment of the present invention, RF tags may be attached to or incorporated with various record-keeping objects, such as photo albums, calendars, etc., and a RF controlled telephone in accordance with the present invention may be used to interface with those items. In this non-telephony embodiment, a memory on the tag, or more preferably in the telecommunications device incorporating the reader or its associated telecommunications system, could be programmed with information by the user recording voice messages using the telephone apparatus. The recorded message would be specific to a particular tagged item, such as a photograph or a date in a calendar. The message could be recalled and played by the user by bringing the reader in the telephone close enough to the RF tag in the item to be read.

In one aspect, the present invention provides a telecommunications device. The device includes a DTMF generator, a microprocessor connected with the DTMF generator, and a radio frequency transceiver connected with said microprocessor. The DTMF generator may dial a telephone number indicated by a signal received from a radio frequency transponder in a radio frequency field generated by the transceiver.

In another aspect, the invention provides a telecommunications system. The system includes a telecommunications device having a DTMF generator, a microprocessor connected with the DTMF generator, and a radio frequency transceiver connected with the microprocessor. The system further includes a radio frequency tag.

In yet another aspect, the invention provides a method of dialing a telephone number with a telecommunications device. The method involves reading the telephone number from a radio frequency transponder with a radio frequency transceiver associated with the device, and enabling a DTMF generator to dial the telephone number received from the radio frequency transponder.

In still another aspect, the invention provides a method of storing a telephone number with a telecommunications device. The method involves reading the telephone number from a radio frequency transponder with a radio frequency transceiver associated with the device, and storing the telephone number in a memory associated with the device.

These and other features and advantages of the present invention will be presented in more detail in the following specification of the invention and the accompanying figures which illustrate by way of example the principles of the invention.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to one or more preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides telecommunications devices and systems which incorporate and use RF tag technology. Teleconmuunications devices in accordance with one embodiment of the present invention incorporate RF transceivers (readers) which are configured to read associated RF transponders (tags) in order to automatically dial desired telephone numbers without the need for a manual user interface. Tags in systems in accordance with this embodiment of the present invention may be attached to or incorporated with a myriad of items, including picture frames, consumer products and packaging, advertising and promotional material, business cards, record-keeping systems, etc., as further described below. Devices and systems in accordance with the present invention have a variety of telephony and non-telephony applications.

Figure 2:
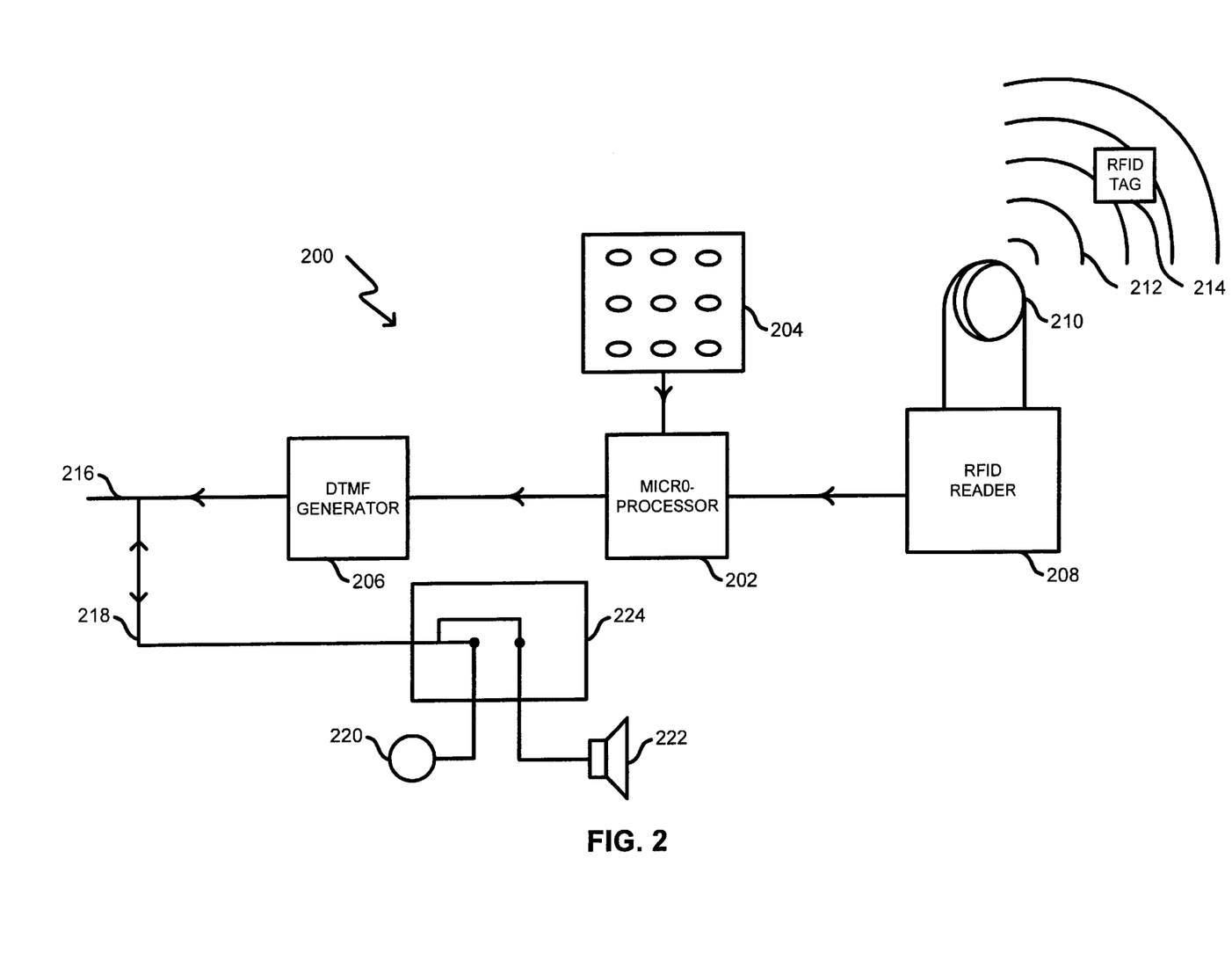
FIG. 2 depicts a block diagram illustrating a radio frequency-controlled telecommunications device and system in accordance with a preferred embodiment of the present invention.

FIG. 2 illustrates a block diagram of a RF-controlled telecommunications device and system in accordance with a preferred embodiment of the present invention. The device may be, for example, a telephone (wired or cordless), a facsimile machine, or a cellular telephone. The device 200 includes a microprocessor 202 which is capable of receiving, processing and sending the various electronic signals involved in the operation of the device. For example, the microprocessor may receive a signal representing a telephone number entered by a user on a keypad interface 204. The microprocessor 202 processes and sends the signal to a DTMF (dual tone multi-frequency) output generator 206 which generates a signal sent out into the telecommunications system with which the device is connected. The device may be connected to the system via a phone line 216 or in the case of a cellular telephone, for example, a wireless connection. The phone line 216 is also connected to a microphone 220 and a speaker 222 via a two-way connection 218 so that voice signals may be sent and received by a user. These elements may be found in many conventional telecommunications systems.

The device 200 also includes a radio frequency transceiver (RFID reader) 208 which includes and antenna 210. The reader 208 allows the device to receive a telephone number to be dialed without a user manually interacting with the keypad 204. The reader 208 generates a radio frequency field 212 transmitted by its antenna 210. If a radio frequency transponder (RFID tag) 214 comes within the field 212, the tag is read and sends a signal back to the reader 208 based on the information requested by a signal in the outgoing field 212. Generally, the signal generated by the reader queries the tag about a telephone number or telephone number code stored in its memory. The tag 214 responds with the telephone number or code. The number or code is then passed to the microprocessor 202 which in turn commands the DTMF generator 206 to dial the desired number.

The reader in devices in accordance with the present invention may be located anywhere within the device. In a preferred embodiment of the present invention, the reader is located in the handset of a telephone or other handheld feature of a telecommunications device to enable it to be more precisely positioned by a user to read a tag. This is particularly useful when a number of tags are close to each other and the reader must be carefully positioned in order to read the desired tag.

The device 200 may also include conventional telephone/telecommunications circuitry and other components the details of which are well known to those of skill in the art and/or are unnecessary for an understanding and implementation of the present invention. These features are generally represented in the figure by block 224.

The embodiment of the present invention depicted in FIG. 2 allows for both manual (via the keypad 204) and automatic entry (via RF signal from a RF tag) of a number to be dialed by the device 200. Of course, other embodiments of the present invention may not even include a keypad or other manual interface, instead relying entirely upon radio frequency signals received by a RF transponder to indicate a number to be dialed.

Systems in accordance with the present invention may have associated computer software including databases of numbers available for dialing selected by a tag/reader interaction controlled by the user. In such systems, an individual or entity's phone number may be represented by a code stored in the RF tag memory which references a telephone number in the database. This embodiment is particularly useful in a number of situations, such as where the numbers of interest are known ahead of time so that relatively short codes rather than the entire numbers are all that is needed to be stored in the tag's relatively limited memory. Also, where an individual or entity's number changes, the new number may be stored in the database in the location accessed by the code stored in the tag memory so that reprogramming of the individual tags is not necessary.

Figure 3:
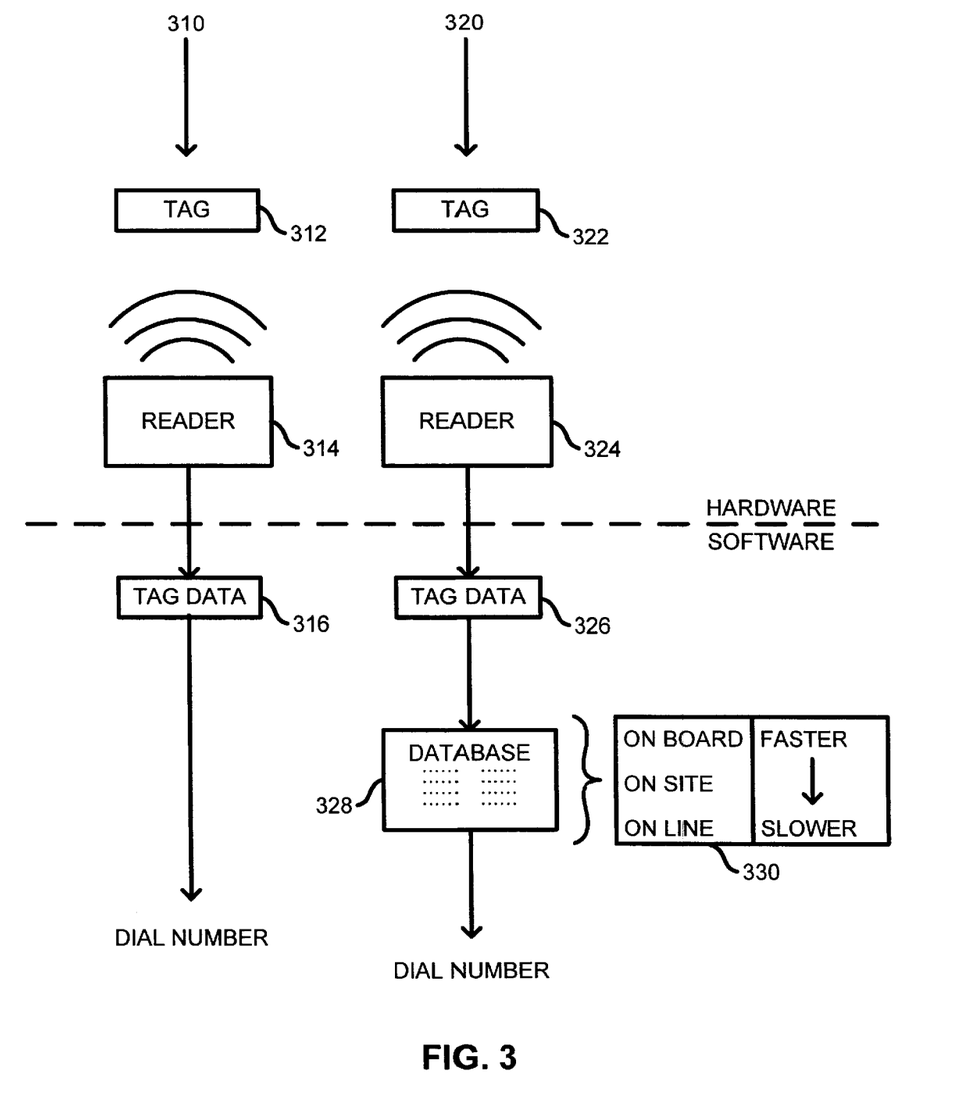
FIG. 3 depicts a block diagram illustrating different approaches to storing telephone numbers to be dialed in some alternative embodiments of RF-controlled telecommunications systems in accordance with the present invention.

Thus, an RF tag in a system in accordance with the present invention may return to the RF reader which polls it either a signal including a complete telephone number which the tag has stored in its memory, or the tag may return a code which refers to a number which is stored off the tag in a memory in the telecommunications device or its associated telecommunications system. FIG. 3 illustrates in block form some alternative embodiments with respect to this aspect of the present invention. In one embodiment, depicted in the left column 310, the number to be dialed is stored on the tag 312 in the tag memory. When the tag 312 is read by the reader 314, the tag data 316 returned contains all the information necessary to dial the number.

In the embodiment depicted in the right column 320, the number to be dialed is stored in an off-tag database 328. The data stored on the tag 322 in the tag memory contains a code which references a number to be dialed stored in the database 328. When the tag 322 is read by the reader 324, the tag data 326 returned is used to determine the number to be dialed from the database 328. The number accessed from the database is then dialed.

The off-tag database embodiment includes additional software not required in the on-tag number storage embodiment. However, it offers additional flexibility and, in large systems, potential cost savings. For example, a system in accordance with this embodiment of the invention may include a plurality of tags each with a different code programmed in its memory referencing a field in the database. The database may be programmed with numbers to be dialed to access various people or entities. If a person or entity's phone number changes after the system is programmed and the tags distributed, the change may be quickly, easily and cheaply made in the database without the need to reprogram any individual tags.

As further illustrated in block 330 of FIG. 3, the database 328 may be located in a memory on board the telecommunications device, or in the telecommunications system with which the device is connected, either on the users site (e.g., within the same building or facility as the device) or online. The closer the database is located to the device, the faster the system will operate. However, locating the database further from the device may offer the advantages of increased accessibility and flexibility with respect to managing the database.

In further embodiments of the present invention, the tag memory could also be programmed with additional data relating to the stored telephone numbers. For example, the tag memory could be programmed with additional numbers, preceding and/or following the stored telephone number, that would allow for access to secured phone systems and automatic navigation of phone mail systems where the sequence to access the desired location is known and programmed into the tag in advance.

In addition, the tag memory could be programmed with data relating to the properties of the stored telephone number. Thus, a facsimile number may have a facsimile property code associated with it. This is particularly useful when a tag or more than one closely-spaced tags are programmed with a plurality of numbers having different property codes. The transceivers in the telecommunications devices reading the tag(s) may be programmed to recognize the property codes associated with the numbers so that, for example, a facsimile machine will use the facsimile number read from the tag(s) rather than a voice line telephone number also stored on the tag(s). Of course, the property data may be stored on a tag or on a database in a telecommunications device or system associated with the tag.

Figure 4:
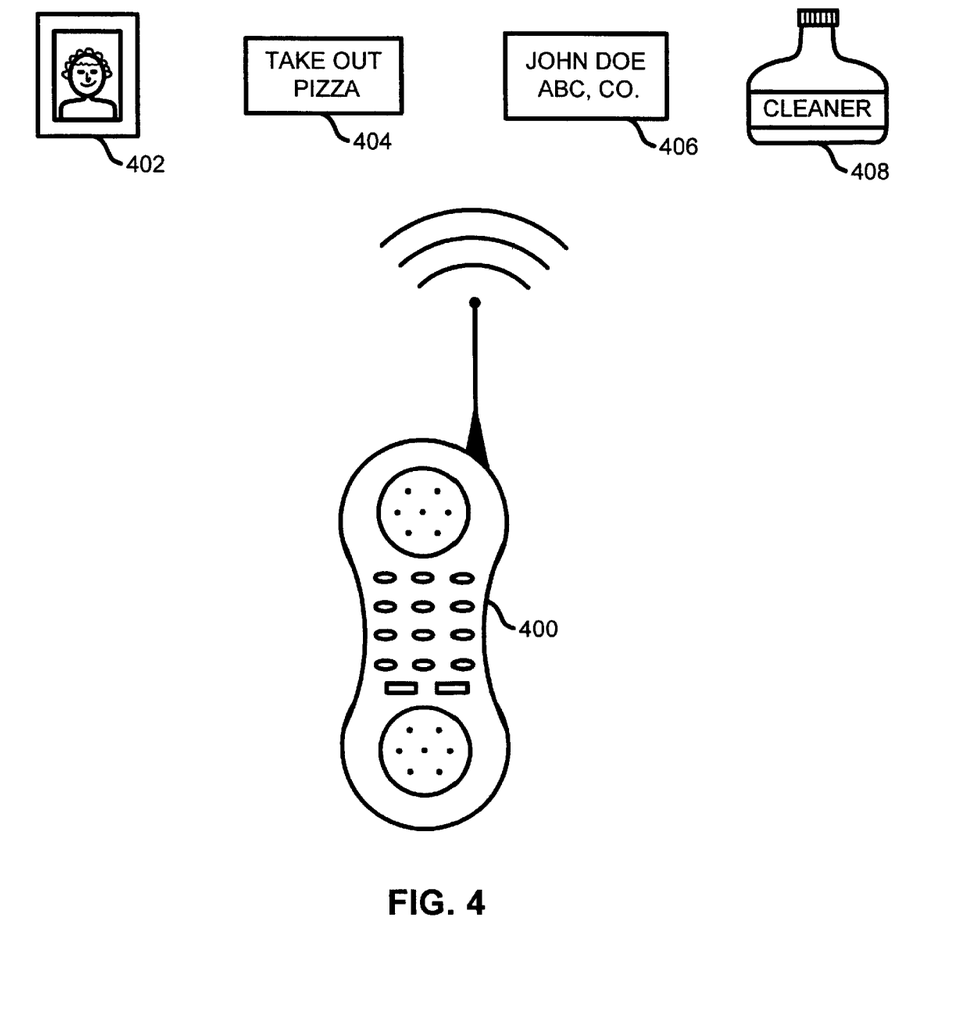
FIG. 4 depicts a block diagram illustrating various implementations of radio frequency-controlled telecommunications systems in accordance with preferred embodiments of the present invention.

Devices and systems in accordance with the present invention have a variety of telephony applications. FIG. 4 illustrates several embodiments of systems using radio frequency controlled telecommunications devices. In the figure, no indication is made to the distinction described with reference to FIG. 3 between the tag memory providing a telephone number or a code for accessing a telephone number from an off-tag database. However, it should be understood that all embodiments of the present invention may be implemented in either way.

FIG. 4 illustrates a telecommunications device in accordance with the present invention, in this case a telephone 400. Telephone 400 is equipped with the components described with reference to FIG. 2. FIG. 4 also shows a variety of objects including a framed picture 402, a pizzeria refrigerator magnet 404, a business card 406, and a bottle of household cleaner 408. Each of the objects has one or more RF tags attached to it with a telephone number or code referencing a telephone number programmed in its memory.

When, for example, the telephone 400 is directed towards the picture frame 402, the RF reader in the phone reads a RF tag in the frame (attached either to the frame or to the picture itself) and automatically dials the phone number of the person in the picture. Similarly, when the phone is directed towards the fridge magnet 404 or the business card 406, the RF reader in the phone reads a RF tag on the magnet or card and automatically dials the phone number of the pizzeria or cardholder, respectively.

Systems in accordance with the present invention also contemplate the presence of multiple RF tags on a given object, such as a consumer product or product packaging. In the case of the cleaner 408, one RF tag may have programmed in its memory the number for the product manufacturers customers service line. A second RF tag may have programmed in its memory the number for the local poison control center. Either of these numbers may be automatically dialed by directing the phone 400 towards the appropriate location on the bottle of cleaner 408, which would be indicated as part of the product labeling.

Figure 5:
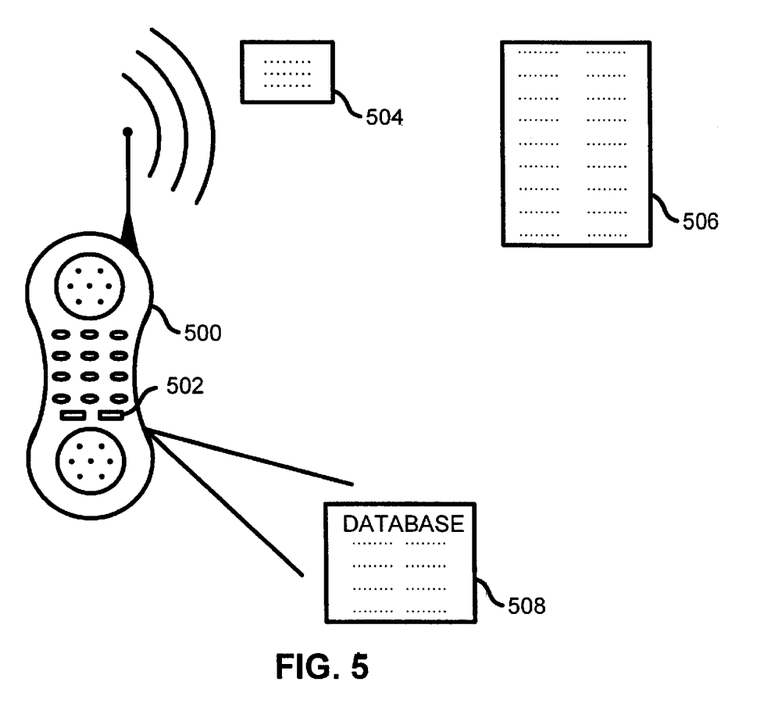
FIG. 5 depicts a block diagram illustrating a number gathering implementation of a radio frequency-controlled telecommunications device and system in accordance with a preferred embodiment of the present invention.

Devices in accordance with the present invention may also include a "number gathering" functionality, as illustrated in FIG. 5. The device 500 may be switched from a default mode of automatically dialing a telephone number indicated by a RF tag read by its RF reader, to a mode where the indicated telephone number is stored in a database for future use. The device 500 may be switched between dialing to gathering modes by pushing a button 502 on the device's keypad, for example. Another button or buttons may be pushed to indicate a location or locations in the memory in which a gathered number(s) is to be stored.

The numbers may be gathered from business cards 504 or directories 506 equipped with RF tags. For example, a portable device 500 in accordance with the present invention may be touched to the business card 504 or directory 506 containing an RF tag to read phone numbers. The so gathered numbers may be stored in specified locations in a database 508, such as previously described with reference to FIG. 3. The gathered numbers may be accessed subsequently for dialing by selecting the appropriate memory location, either by pushing a button, such as in a conventional "speed dial" system, or tags may be made for each of the gathered numbers so that they may be automatically dialed by directing the device to the a tag for the desired number.

Radio frequency controlled telecommunications devices in accordance with the present invention may also be used in conjunction with interactive radio frequency tags, such as described in co-pending application Ser. No. 09/306,688, filed May 6,1999, entitled INTERACTIVE RADIO FREQUENCY TAGS, previously incorporated by reference. Such tags include interactive RF button tags which may be used in such items as a "smart business card." With the smart business card, the user presses the appropriate button on a RF tag business card, causing the relevant IC to make contact with the antenna to activate the tag. The card may be equipped with several buttons, each representing a different item of information. So, for instance, when a user presses the "home phone" button on the business card, the RF reader in a device in accordance with the present invention will receive a response indicating the cardholder's home telephone number. Similarly, the user may press "office phone" button on the card to have the same happen with the appropriate office number. Pressing a "Fax" button may similarly initiate a fax to the correct number where the RF controlled telecommunications device is a facsimile machine.

Radio frequency controlled devices and systems in accordance with the present invention also have a variety of non-telephony applications. The inclusion of a RF transponder in a telecommunications device allows the device not only to both read from and write to RF tags attached to or incorporated in a variety of objects, but also to record and playback voice messages and other audible material from a memory. In one embodiment of the present invention, RFI tags may be attached to or incorporated with various recordkeeping objects, such as photo albums, calendars, etc., and a RF controlled telephone in accordance with the present invention may be used to interface with those items. In this non-telephony embodiment, a memory on the tag, or more preferably in the telecommunications device incorporating the reader or its associated telecommunications system, could be programmed with information by the user recording voice messages using the telephone apparatus. The recorded message would be specific to a particular tagged item, such as a photograph or a date in a calendar. The message could be recalled and played by the user by bringing the reader in the telephone close enough to the RF tag in the item to be read.

Figure 6:
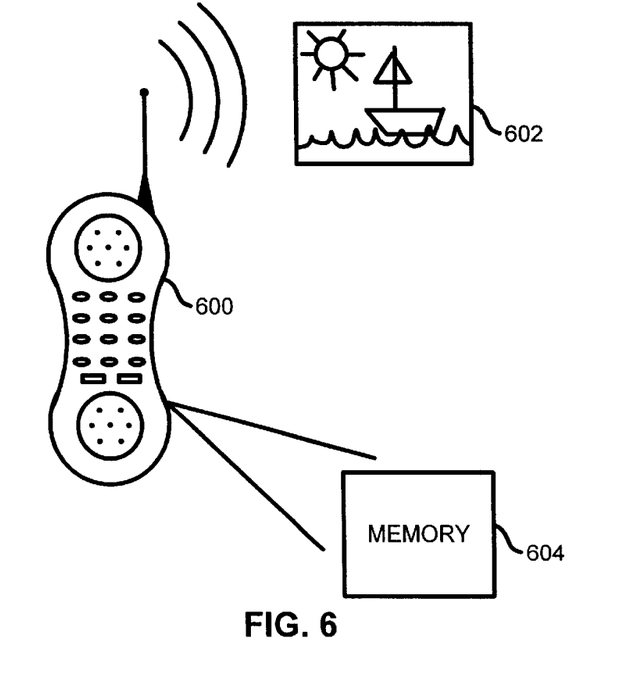
FIG. 6 depicts a block diagram illustrating a non-telephony implementation of radio frequency-controlled telecommunications device and system in accordance with a preferred embodiment of the present invention.

As shown in FIG. 6, in non-telephony applications of the present invention, a code stored in a RF tag attached to an object 602 may be used to signal the telecommunications device 600 to access a memory location 604, preferably located off the tag in the telecommunications system of which the device is a part. The device 600 may then be used to hear a previously recorded audible message relating to the object 602 or to record a new one in that memory location 604.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A telecommunications device, comprising:
   a DTMF generator;
   a microprocessor coupled to said DTMF generator; and
   a radio frequency transceiver coupled to said microprocessor;
   wherein said radio frequency transceiver is configured to:
      detect existence of a radio frequency tag;
      receive from said radio frequency tag a radio frequency signal comprising tag data associated with said radio frequency tag, said tag data being associated with an item with which the radio frequency tag is associated; and
      provide said tag data to the microprocessor;
   wherein said microprocessor is configured to:
      receive said tag data from the radio frequency transceiver;
      associate said tag data with an associated DTMF sequence; and
      cause the DTMF generator to provide said associated DTMF sequence as output; and
   wherein said radio frequency tag is attached to a picture frame in which a picture of a person is displayed and wherein said tag data is associated with a telephone number for said person, whereby said microprocessor causes the DTMF generator to dial said telephone number for said person in response to receiving said tag data.

2. The device of claim 1, wherein said tag data comprises an indicated number associated with said telephone number for said person.

3. The device of claim 1, wherein:
   said device further comprises a database of phone numbers; and
   said microprocessor is configured to access said database of phone numbers to associate said tag data with said telephone number for said person.

4. The device of claim 2, wherein said tag data comprises a complete telephone number for said person.

5. The device of claim 2, further comprising a database of telephone numbers and wherein said microprocessor is further configured to query said database using said tag data to obtain said telephone number for said person.

6. The device of claim 5, wherein said indicated number is a code referencing complete telephone number in said database.

7. The device of claim 1, further comprising a keypad connected with said microprocessor.

8. The device of claim 1, wherein said device is a telephone.

9. The device of claim 1, wherein said device is a facsimile machine.

10. The device of claim 1, wherein said device is a cellular telephone.

11. The device of claim 2, wherein said signal received from said radio frequency transponder further comprises voice mail access and/or navigation numbers.

12. The device of claim 1, wherein said signal received from said radio frequency transponder further comprises telephone number property data.

13. The device of claim 12, wherein said property data comprises one of voice line, facsimile line and data line.

14. A telecommunications system, comprising: a
   telecommunications device, including,
      a DTMF generator,
      a microprocessor coupled to said DTMF generator, and
      a radio frequency transceiver coupled to said microprocessor; and
   a radio frequency tag;
   wherein said radio frequency tag is configured to provide as output a radio frequency signal comprising tag data associated with an item with which said radio frequency tag is associated;
   wherein said radio frequency transceiver is configured to:
      detect existence of the radio frequency tag;
      receive said radio frequency signal comprising tag data from said radio frequency tag; and
      provide said tag data to the microprocessor;
   wherein said microprocessor is configured to:
      receive said tag data from the radio frequency transceiver;
      associate said tag data with an associated DTMF sequence; and
      cause the DTMF generator to provide said associated DTMF sequence as output; and
   wherein said radio frequency tag is attached to a picture frame in which a picture of a person is displayed and wherein said tag data is associated with a telephone number for said person, whereby said microprocessor causes the DTMF generator to dial said telephone number for said person in response to receiving said tag data.

15. The system of claim 14, wherein:
   said system further comprises a database of telephone numbers; and
   said microprocessor is configured to access said database of phone numbers to associated said tag data with said telephone number for said person.

16. The system of claim 14, wherein said radio frequency tag is an interactive radio frequency tag.

* * * * *